US012548975B2

(12) United States Patent
Sorg et al.

(10) Patent No.: US 12,548,975 B2
(45) Date of Patent: Feb. 10, 2026

(54) SEMICONDUCTOR LASER COMPONENT AND METHOD FOR OPERATING AT LEAST ONE SEMICONDUCTOR LASER (71) Applicant: ams-OSRAM International GmbH, Regensburg (DE)

(72) Inventors: Jörg Erich Sorg, Regensburg (DE); Markus Reinhard Horn, Bayerbach Bei Ergoldsbach (DE); Jan Seidenfaden, Neumarkt I.D. Oberpfalz (DE); Harald König, Bernhardswald (DE)

(73) Assignee: ams-OSRAM International GmbH, Regensburg (DE)

( * ) Notice: Subject to any disclaimer, the term of this patent is extended or adjusted under 35 U.S.C. 154(b) by 573 days.

(21) Appl. No.: 17/998,635

(22) PCT Filed: May 5, 2021

(86) PCT No.: PCT/EP2021/061882
§ 371 (c)(1),
(2) Date: Nov. 11, 2022

(87) PCT Pub. No.: WO2021/228660
PCT Pub. Date: Nov. 18, 2021

(65) Prior Publication Data
US 2023/0198231 A1    Jun. 22, 2023

(30) Foreign Application Priority Data
May 12, 2020  (DE) ..................... 10 2020 112 806.1

(51) Int. Cl.
*H01S 3/10* (2006.01)
*H01S 5/0225* (2021.01)
(Continued)

(52) U.S. Cl.
CPC ........ *H01S 5/06817* (2013.01); *H01S 5/0225* (2021.01); *H01S 5/026* (2013.01);
(Continued)

(58) Field of Classification Search
CPC .... H01S 5/06817; H01S 5/0225; H01S 5/026; H01S 5/0607; H01S 5/0622;
(Continued)

(56) References Cited

U.S. PATENT DOCUMENTS

| 5,228,050 A * | 7/1993 | LaCourse | H01S 5/4031 |
| | | | 372/97 |
| 8,451,876 B1 * | 5/2013 | Raring | H10H 20/042 |
| | | | 372/49.01 |
| 2001/0019562 A1 * | 9/2001 | Kai | H01S 5/0687 |
| | | | 372/20 |

(Continued)

FOREIGN PATENT DOCUMENTS

| DE | 102009013909 A1 | 9/2010 |
| EP | 2048753 A1 | 4/2009 |

(Continued)

*Primary Examiner* — Kinam Park
(74) *Attorney, Agent, or Firm* — Slater Matsil, LLP (57) ABSTRACT

In an embodiment a semiconductor laser component includes a plurality of semiconductor lasers, each of the semiconductor lasers configured to emit primary electromagnetic radiation of a primary spectral bandwidth in a visible wavelength range and a beam combiner configured to combine the primary electromagnetic radiations emitted from the semiconductor lasers, form secondary electromagnetic radiation from a superposition of the primary electromagnetic radiations of the semiconductor lasers and couple the secondary electromagnetic radiation out from the beam combiner, wherein the secondary electromagnetic radiation has a secondary spectral bandwidth that is at least twice as large as an average value of the primary spectral bandwidths.

19 Claims, 5 Drawing Sheets (51) Int. Cl.
    *H01S 5/026*   (2006.01)
    *H01S 5/06*    (2006.01)
    *H01S 5/062*   (2006.01)
    *H01S 5/068*   (2006.01)
    *H01S 5/10*    (2021.01)
    *H01S 5/40*    (2006.01)
    *H01S 5/30*    (2006.01)

(52) U.S. Cl.
    CPC .......... *H01S 5/0607* (2013.01); *H01S 5/0622* (2013.01); *H01S 5/06812* (2013.01); *H01S 5/1039* (2013.01); *H01S 5/4012* (2013.01); *H01S 5/4087* (2013.01); *H01S 5/06216* (2013.01); *H01S 5/305* (2013.01)

(58) Field of Classification Search
    CPC .. H01S 5/06812; H01S 5/1039; H01S 5/4012; H01S 5/4087; H01S 5/06216; H01S 5/305; H01S 5/0265; H01S 5/0261; H01S 5/02326; H01S 5/0287
    See application file for complete search history.

(56) References Cited

U.S. PATENT DOCUMENTS

| | | |
|---|---|---|
| 2002/0196414 A1 | 12/2002 | Manni et al. |
| 2003/0026311 A1* | 2/2003 | Barenburg ......... G02B 6/12004 |
| | | 372/50.1 |
| 2003/0026515 A1 | 2/2003 | Barenburg et al. |
| 2008/0205459 A1 | 8/2008 | Yonekubo |
| 2008/0212639 A1 | 9/2008 | Heusler et al. |
| 2012/0250715 A1 | 10/2012 | Mueller et al. |
| 2013/0194787 A1 | 8/2013 | Geske et al. |
| 2014/0029638 A1 | 1/2014 | Welford et al. |
| 2016/0254639 A1 | 9/2016 | Watanabe |
| 2016/0372893 A1* | 12/2016 | McLaurin ............. H01S 5/0217 |
| 2019/0361327 A1 | 11/2019 | Ma et al. |
| 2019/0386455 A1* | 12/2019 | Nagahara ............. H01S 5/0235 |
| 2022/0042672 A1* | 2/2022 | Raring ................. H01S 5/4087 |

FOREIGN PATENT DOCUMENTS

| | | |
|---|---|---|
| JP | 201259963 A | 3/2012 |
| WO | 2013161462 A1 | 10/2013 |

\* cited by examiner

SEMICONDUCTOR LASER COMPONENT AND METHOD FOR OPERATING AT LEAST ONE SEMICONDUCTOR LASER

This patent application is a national phase filing under section 371 of PCT/EP2021/061882, filed May 5, 2021, which claims the priority of German patent application 102020112806.1, filed May 12, 2020, each of which is incorporated herein by reference in its entirety.

TECHNICAL FIELD

An optoelectronic semiconductor laser component and a method for operating at least one semiconductor laser are disclosed. In particular, the optoelectronic semiconductor laser component is intended to generate electromagnetic radiation, for example light that is perceptible to the human eye.

SUMMARY

Embodiments provide an optoelectronic semiconductor laser component that emits electromagnetic radiation with an increased spectral bandwidth.

According to at least one embodiment, the semiconductor laser component comprises a plurality of semiconductor lasers. Each semiconductor laser is provided for emitting coherent or at least partially coherent electromagnetic radiation. Each semiconductor laser preferably comprises a p-type semiconductor region and an n-type semiconductor region, and an active region provided for emission of electromagnetic radiation.

In particular, the electromagnetic radiation emitted by the semiconductor lasers has a substantially equal main emission wavelength. In case of doubt, the main emission wavelength of an electromagnetic emission spectrum is the wavelength at which the spectrum has a global intensity maximum.

According to at least one embodiment, the semiconductor laser component comprises a beam combiner arranged to combine the electromagnetic radiation of the semiconductor lasers. Preferably, a superposition of the electromagnetic radiation of all semiconductor lasers is performed. For example, the beam combiner has a plurality of input coupling surfaces for coupling electromagnetic radiation into the beam combiner and a plurality of waveguides for guiding and superimposing the coupled electromagnetic radiation with each other and an output coupling surface for coupling out the electromagnetic radiation.

According to at least one embodiment of the semiconductor laser component, the semiconductor lasers each emit primary electromagnetic radiation with a primary spectral bandwidth in the visible wavelength range. The spectral range visible to humans extends in particular from 380 nm to 780 nm. The spectral bandwidth is understood here and in the following as a "full width at half maximum" bandwidth (FWHM). For example, each semiconductor laser emits a primary electromagnetic radiation with a different main emission wavelength. Preferably, the main emission wavelengths of the semiconductor lasers differ by 0.5 nm to 3 nm and in particular by 1 nm to 2 nm.

According to at least one embodiment of the semiconductor laser component, the primary electromagnetic radiation of the semiconductor lasers is coupled into the beam combiner. The coupling into the beam combiner takes place in particular via an input coupling surface of the beam combiner.

According to at least one embodiment of the semiconductor laser component, a secondary electromagnetic radiation is coupled out of the beam combiner, which is formed from a superposition of the primary electromagnetic radiation of the semiconductor lasers. Preferably, secondary radiation formed from a superposition of the primary radiation of all semiconductor lasers is coupled out of the combiner. For example, the secondary electromagnetic radiation couples out at an output coupling surface of the beam combiner.

According to at least one embodiment of the semiconductor laser component, the secondary electromagnetic radiation has a secondary spectral bandwidth that is at least twice as large as an average value of the primary spectral bandwidths. An arithmetic mean of the bandwidths is to be understood as a mean value here and in the following. An increased spectral bandwidth leads to an advantageously reduced coherence length.

According to at least one embodiment of the semiconductor laser component, the semiconductor laser component comprises a plurality of semiconductor lasers and a beam combiner adapted to combine radiation emitted by the semiconductor lasers, wherein the semiconductor lasers each emit primary electromagnetic radiation of a primary spectral bandwidth in the visible wavelength range,
the primary electromagnetic radiation of the semiconductor lasers is coupled into the beam combiner,
secondary electromagnetic radiation is coupled out of the beam combiner, which is formed from a superposition of the primary electromagnetic radiation of the semiconductor lasers, and
the secondary electromagnetic radiation has a secondary spectral bandwidth that is at least twice as large as an average value of the primary spectral bandwidths.

A semiconductor laser component described here is based, among other things, on the following considerations: Laser components exhibit good beam quality, making them particularly suitable for use in display units or projection devices. In addition to the good beam quality, laser components also have a particularly small extension of an emission range, which corresponds approximately to a point light source. This results in an advantageously high luminance, which can contribute to the miniaturization of optical systems. However, when a laser component is used in a visible wavelength range, undesirable interference effects, for example in the form of speckles, are sometimes perceptible to an observer. These interference effects lead to uneven illumination and disturbing patterns. Furthermore, the use of diffractive optics together with electromagnetic radiation with a large coherence length is hampered by additional undesirable interference effects.

The semiconductor laser component described herein makes use, among other things, of the idea of generating electromagnetic radiation with an increased spectral bandwidth and, consequently, with a reduced coherence length, which nevertheless has a sufficiently good beam quality. For this purpose, a secondary electromagnetic radiation with an increased secondary spectral bandwidth can be generated by means of a superposition of a plurality of primary electromagnetic radiations of a plurality of semiconductor lasers. An increase in spectral bandwidth is accompanied by a decrease in coherence length. A less coherent radiation advantageously reduces the intensity of occurring undesired interference effects. This advantageously facilitates the use of diffractive optics and the occurrence of speckles is advantageously reduced or prevented.

According to at least one embodiment of the semiconductor laser component, the secondary spectral bandwidth is between 5 nm and 10 nm. A larger spectral bandwidth advantageously reduces or avoids the disturbing influence of optical interference effects.

According to at least one embodiment of the semiconductor laser component, the beam combiner is a monolithic component. A monolithic component is characterized in particular by the fact that it is formed in one piece. Thus, the beam combiner is particularly easy to adjust with respect to a plurality of semiconductor lasers or a subsequent optical element. Furthermore, a monolithic optical component advantageously achieves a high optical efficiency by avoiding refractive index jumps at material boundaries.

According to at least one embodiment of the semiconductor laser component, the semiconductor lasers have different resonator lengths. A resonator comprises at least two reflective surfaces between which an optically active medium is arranged. In an optical resonator, amplification of electromagnetic radiation whose wavelength satisfies a resonance condition of the resonator is mainly performed. The resonance wavelength of the resonator is determined, among other things, by the length of the resonator. Consequently, a different resonator length of a semiconductor laser causes a different main emission wavelength of the associated semiconductor laser. Advantageously, an increased secondary spectral bandwidth is thus achievable. Preferably, the resonator length of a semiconductor laser component differs from at least one other semiconductor laser component, in particular the semiconductor laser component whose resonator length comes closest to the resonator length of the first-mentioned semiconductor laser component, by at least 5% and by at most 100%, particularly preferably by at most 20%.

According to at least one embodiment of the semiconductor laser component, the semiconductor lasers are arranged on a common substrate. Preferably, all semiconductor lasers are arranged on a common substrate. The arrangement of the semiconductor lasers on a common substrate facilitates an alignment of the individual emitters, for example with respect to a beam combiner. A common substrate can further simplify electrical contacting of the semiconductor lasers by acting as a common anode or cathode. Particularly good heat dissipation of the semiconductor lasers results if a p-type semiconductor layer of the semiconductor laser is mounted facing the substrate in each case.

According to at least one embodiment of the semiconductor laser component, at least a part of the semiconductor lasers is arranged on a separate substrate. The arrangement of the semiconductor lasers on separate substrates enables the selection of different substrate materials each having different properties. For example, the substrate materials differ in their thermal conductivity and/or in their electrical conductivity.

Due to a different thermal conductivity, a different operating temperature of the semiconductor laser arranged thereon can be set. For example, when using a material with a lower thermal conductivity, a higher operating temperature of the semiconductor laser arranged thereon can be achieved. Furthermore, the different electrical properties can be used to further selectively influence the operating parameters of each semiconductor laser. A different electrical resistance leads, among other things, to different operating currents and/or to different operating temperatures of the semiconductor laser arranged thereon. Among other things, an increased electrical resistance is responsible for further heating of the substrate and thus also for a higher operating temperature of the semiconductor laser mounted thereon.

According to at least one embodiment of the semiconductor laser component, an insulating layer is disposed between at least one semiconductor laser and the substrate. The insulating layer is suitable, for example, for producing a different thermal resistance and/or a different electrical resistance between a semiconductor laser and an associated substrate. A different thermal resistance leads, among other things, to a different operating temperature of the semiconductor laser and thus influences the main emission wavelength of the associated semiconductor laser. A different electrical resistance leads in particular to a different operating current and thus to a changed operating point of the associated semiconductor laser.

According to at least one embodiment of the semiconductor laser component, the insulating layer is formed with silicon oxide or silicon nitride. Silicon oxide and silicon nitride are advantageously particularly easy to deposit on a given substrate material and are easy to pattern using conventional processes.

According to at least one embodiment of the semiconductor laser component, at least one semiconductor laser comprises a doping with a dopant that changes an emission wavelength of the semiconductor laser. For example, local doping is performed with at least one of the following dopants: boron, zinc, carbon, silicon.

According to at least one embodiment of the semiconductor laser component, the semiconductor lasers are formed in a monolithic semiconductor body. Preferably, all semiconductor lasers are formed in a monolithic semiconductor body. In other words, the semiconductor lasers are combined in a so-called laser bar. A laser bar facilitates an alignment to a downstream optical element, such as a beam combiner. Furthermore, the arrangement of the semiconductor lasers in a laser bar enables a particularly compact design of the semiconductor laser component.

According to at least one embodiment of the semiconductor laser component, the semiconductor lasers are arranged at different lateral distances from each other. Different lateral distances may cause different operating temperatures of the individual semiconductor lasers. For example, a semiconductor laser mounted closer to a heat sink may operate at a lower operating temperature than a semiconductor laser mounted farther away. Due to different operating temperatures, different main emission wavelengths of the individual semiconductor lasers may advantageously result.

According to at least one embodiment of the semiconductor laser component, an actuator generates a time-modulated mechanical stress in at least one semiconductor laser. A variable mechanical stress varies, among other things, the main emission wavelength of the associated semiconductor laser.

According to at least one embodiment of the semiconductor laser component, an actuator is associated with the semiconductor lasers, each of which generates a time-modulated mechanical stress on the semiconductor lasers. Preferably, an actuator is associated with each semiconductor laser. Different variations of the mechanical stress of the semiconductor lasers can further contribute to an increase of the spectral bandwidth of the secondary electromagnetic radiation. In particular, different modulation of the semiconductor lasers occurs, which is not coordinated with each other. In other words, the modulation of the semiconductor lasers is advantageously not correlated with each other.

According to at least one embodiment of the semiconductor laser component, the actuator comprises a piezoelectric element. Advantageously, a piezo element can be driven particularly quickly and can generate a particularly high mechanical stress.

According to at least one embodiment of the semiconductor laser component, a gradient mirror is arranged at an output coupling region of at least one semiconductor laser. A gradient mirror is characterized by a locally different reflectivity. A different reflectivity, which varies over several semiconductor lasers, in turn leads to a different operating point of the semiconductor lasers and thus generates different main emission wavelengths of the semiconductor lasers.

According to at least one embodiment of the semiconductor laser component, a dielectric mirror is arranged at an output coupling region of at least one semiconductor laser. A dielectric mirror, in particular a distributed Bragg reflector (DBR mirror), exhibits high reflectivity at a resonant frequency and therefore can also cause a different main emission wavelength of the individual semiconductor lasers. A DBR mirror comprises a plurality of layers with periodically alternating refractive indices. Preferably, the number of alternating layers of the dielectric mirror varies from one semiconductor laser to another, resulting in a variation in reflectivity. For example, the resonant frequencies of the DBR mirrors of several semiconductor lasers each differ by a few nm.

According to at least one embodiment of the semiconductor laser component, an optical layer sequence is arranged within the resonator of at least one semiconductor laser, the refractive index of which can be changed by applying an external electric voltage or an electric current. Preferably, the optical layer sequence is arranged within the resonator at the output coupling region. Thus, by means of a time-variable refractive index, a change in the optical and/or the actual length of the resonator can be generated. In particular, a modulation of the resonator length takes place. A time-varying resonator length causes, among other things, an increased primary spectral bandwidth of the semiconductor laser. Preferably, the optical layer sequence is electrically non-conductive.

In particular, piezoelectric and/or ferroelectric materials are suitable as materials for the optical layer sequence. Typically, the optical layer sequence is formed with a material having a perovskite structure. Preferably, the optical layer sequence is formed with at least one of the following materials: Quartz $SiO_2$, aluminum nitride AlN, lithium niobate $LiNbO_3$, gallium orthophosphate $GaPO_4$, PZT (lead zirconate titanate) $Pb(Zr_xTi_{1-x})O_3$, Bismuth titanate $Bi_4Ti_3O_{12}$, Bismuth lanthanum titanate $Bi_{(4-x)}La_xTi_3O_{12}$, Bismuth titanate niobate $Bi_3TiNbO_9$, Strontium titanate $SrTiO_3$, Barium strontium titanate $Ba_xSr_{(1-x)}TiO$.

According to at least one embodiment of the semiconductor laser component, the semiconductor lasers are mounted on the beam combiner. Thus, a substrate can be advantageously dispensed with. Furthermore, a particularly simple alignment of the semiconductor lasers to the input coupling surfaces of the beam combiner is possible and a very compact design is achieved.

A method for operating at least one semiconductor laser is further disclosed. The method for operating at least one semiconductor laser is particularly suitable for operating a semiconductor laser in a semiconductor laser component described herein. That is, all features disclosed in connection with the semiconductor laser component are also disclosed for the method for operating at least one semiconductor laser, and vice versa.

According to at least one embodiment of the method for operating at least one semiconductor laser, each semiconductor laser has a characteristic curve of its optical output power over its operating time, which first comprises an increase region and then a stationary region. Each semiconductor laser is preferably operated in pulsed mode, so that operation takes place predominantly in its increase region. In the increase region, a threshold for laser operation is exceeded. Once the laser threshold is exceeded, electromagnetic radiation from stimulated emission is increasingly emitted and the intensity increases at a constant electric current. However, in a short time window after the laser threshold is exceeded, the resonator does not yet oscillate stably. In this time window, the spectral bandwidth of the semiconductor laser is higher. In the increase region, the semiconductor laser thus does not yet have a stable operating point and emits electromagnetic radiation with a higher spectral bandwidth than in its stationary region. To take advantage of this effect, it is necessary to switch off the semiconductor laser before the oscillations in the resonator have stabilized and thus the spectral bandwidth decreases again. Modulation of the semiconductor lasers with short pulses for predominant operation in the non-stable operating point consequently leads to the emission of electromagnetic radiation with an advantageously increased spectral bandwidth.

According to at least one embodiment of the method for operating a plurality of semiconductor laser components, at least two semiconductor lasers are operated simultaneously pulsed in their increase region, or at least two semiconductor lasers are operated successively pulsed in their increase region. Simultaneously means here and in the following, simultaneously within a tolerance period of milliseconds, in particular within a period of time not perceptible to the human eye. By means of a simultaneous pulsed operation or a successively pulsed operation of several semiconductor lasers, an electromagnetic radiation with an advantageously increased intensity at an additionally advantageously increased spectral bandwidth can be perceived by an observer. In the case of pulsed operation of a single semiconductor laser to increase its spectral bandwidth, on the other hand, a reduction in the intensity of the emitted electromagnetic radiation would be unavoidable.

A semiconductor laser component described herein is particularly suitable for use in so-called "smart eyewear products" with which augmented reality (AR), or virtual reality (VR) units, are realized. The semiconductor laser components described here can also be used in various projection systems for displaying image content, for example in glasses, close to the eye or for direct projection of an image into a human eye.

BRIEF DESCRIPTION OF THE DRAWINGS

Further advantages and advantageous embodiments and further embodiments of the semiconductor laser component result from the following embodiments illustrated in connection with the figures.

DETAILED DESCRIPTION OF ILLUSTRATIVE EMBODIMENTS

Elements that are identical, similar or have the same effect are given the same reference signs in the figures. The figures and the proportions of the elements shown in the figures are not to be regarded as to scale. Rather, individual elements may be shown exaggeratedly large for better representability and/or for better comprehensibility.

Figure 1:
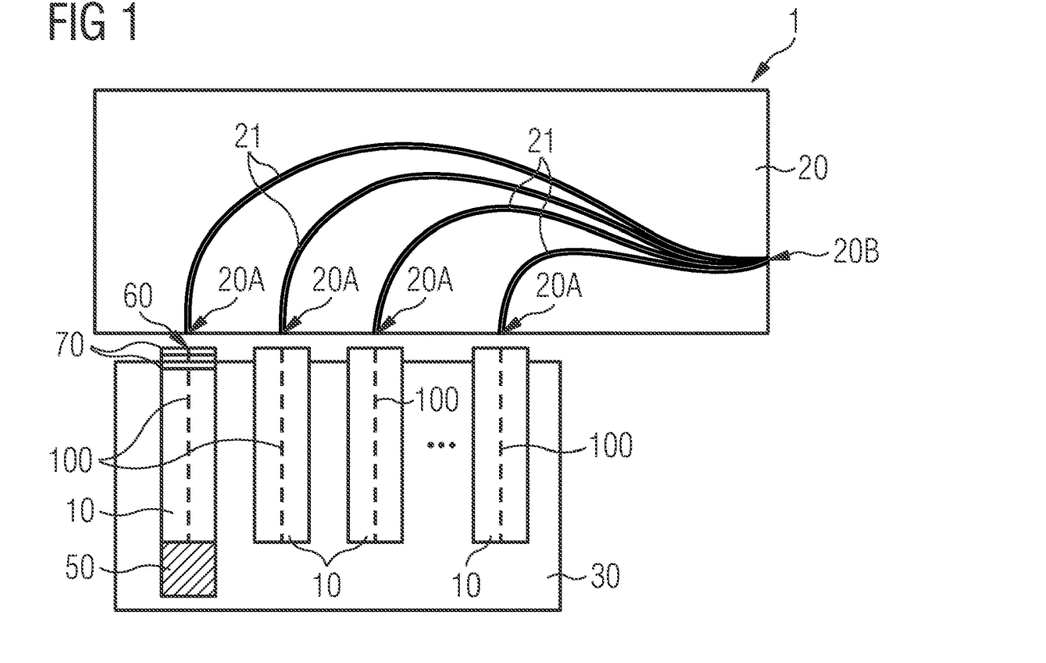
FIG. 1 shows a schematic top view of a semiconductor laser component described herein according to a first embodiment.

FIG. 1 shows a schematic top view of a semiconductor laser component 1 described herein according to a first embodiment. The semiconductor laser component 1 includes a beam combiner 20 and a plurality of semiconductor lasers 10 on a common substrate 30. The beam combiner 20 includes a plurality of waveguides 21 embedded in the beam combiner 20. Further, the beam combiner 20 includes a plurality of input coupling surfaces 20A and an output coupling surface 20B.

The beam combiner 20 is formed with a translucent or transparent material. Preferably, the waveguides 21 are inscribed into the material of the beam combiner 20 by means of a laser. Such waveguides 21 are characterized by a particularly high optical efficiency. The waveguides 21 are arranged in such a way that all electromagnetic radiation coupled in via the input coupling surfaces 20A are combined with each other and coupled out in the common output coupling surface 20B.

The semiconductor lasers 10 are arranged on a common substrate 30 and each comprise a resonator 100. The resonators 100 each extend along the semiconductor lasers 10 to an output coupling region 60. A gradient mirror or a dielectric mirror, for example, is arranged at the output coupling region 60. In particular, an optical layer sequence 70 is arranged in the resonator 100 at the output coupling region 60, the refractive index of which can be changed, for example, by applying an external electrical voltage or an electrical current. Thus, by means of a time-variable refractive index, a change in the optical and/or actual length of the resonator 100 can be produced. By means of a time-varying electrical voltage, the refractive index of the optical layer sequence 70 can be modulated. A temporally modulated resonator length 100A causes, among other things, an increased primary spectral bandwidth of the semiconductor laser 10.

Each semiconductor laser 10 emits a respective primary electromagnetic radiation of a primary spectral bandwidth in the direction parallel to its resonator axis 100, and couples this primary electromagnetic radiation into the beam combiner 20. In the beam combiner 20, these primary electromagnetic radiations are guided and superimposed with each other in the waveguides 21 and finally coupled out as a secondary electromagnetic radiation at an output coupling surface 20B of the beam combiner 20. The coupled-out secondary electromagnetic radiation from the beam combiner 20 has a secondary spectral bandwidth that is at least twice the arithmetic mean of the respective primary spectral bandwidths of the electromagnetic radiations of the semiconductor lasers 10.

An actuator 50 is arranged on the opposite side of an output coupling region 60 of a semiconductor laser 10. The actuator 50 comprises a piezoelectric element and is used for modulated mechanical stressing of the semiconductor laser 10, thereby increasing the primary spectral bandwidth of the primary electromagnetic radiation emitted from that semiconductor laser 10.

Figure 2:
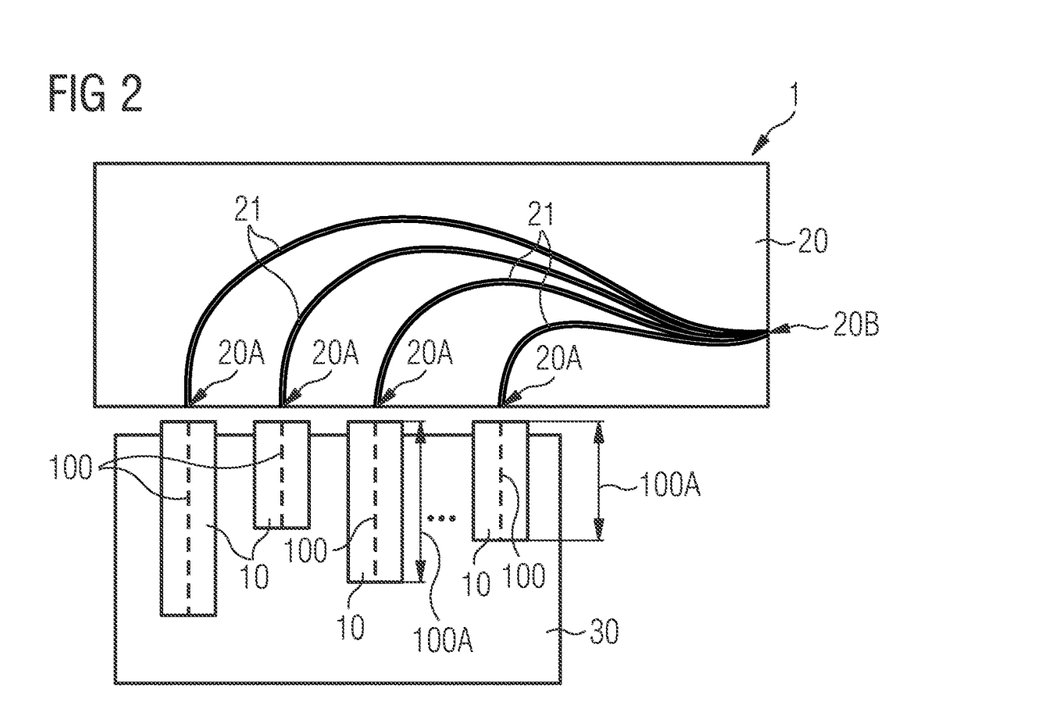
FIG. 2 shows a schematic top view of a semiconductor laser component described herein according to a second embodiment.

FIG. 2 shows a schematic top view of a semiconductor laser component 1 described herein according to a second embodiment of a semiconductor laser component 1. The second embodiment is substantially the same as the first embodiment shown in FIG. 1. However, the semiconductor lasers 10 differ in the length of their resonators 100, each semiconductor laser 10 having a different resonator length 100A.

The different resonator lengths 100A result in different main emission wavelengths of the respective semiconductor lasers 10, allowing a further increase in the secondary spectral bandwidth of the secondary electromagnetic radiation.

Figure 3:
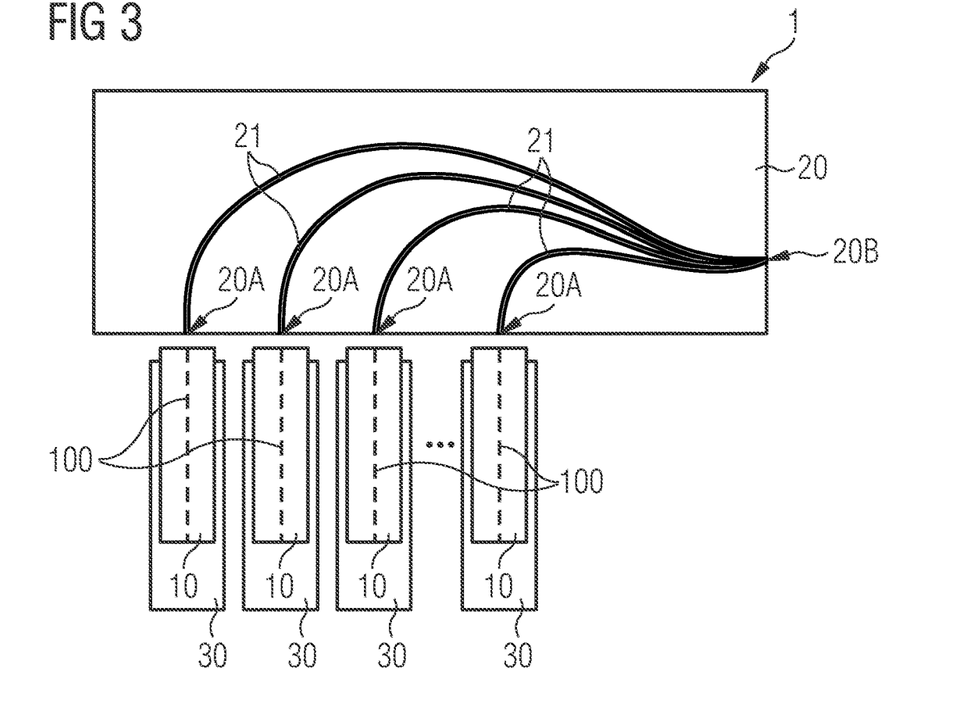
FIG. 3 shows a schematic top view of a semiconductor laser component described herein according to a third embodiment

FIG. 3 shows a schematic top view of a semiconductor laser component 1 described herein according to a third embodiment example. The third embodiment example shown in FIG. 3 is substantially the same as the first embodiment example of a semiconductor laser component 1 shown in FIG. 1.

In contrast to the first embodiment, each semiconductor laser 10 is arranged on a separate substrate 30. The arrangement on separate substrates 30 enables a particularly simple influencing of a thermal resistance and/or an electrical resistance between a semiconductor laser 10 and the associated substrate 30.

For example, each substrate 30 has a different material. Thus, a different operating temperature and/or electrical behavior of each semiconductor laser 10 can be achieved. This advantageously results in an increased secondary spectral bandwidth of the secondary electromagnetic radiation. Some of the semiconductor lasers 10 are disposed on a substrate 30 formed with a material having a reduced thermal conductivity. These semiconductor lasers 10 have difficulty dissipating their waste heat generated during operation and thus reach an elevated operating temperature, resulting in an altered main emission wavelength.

Figure 4:
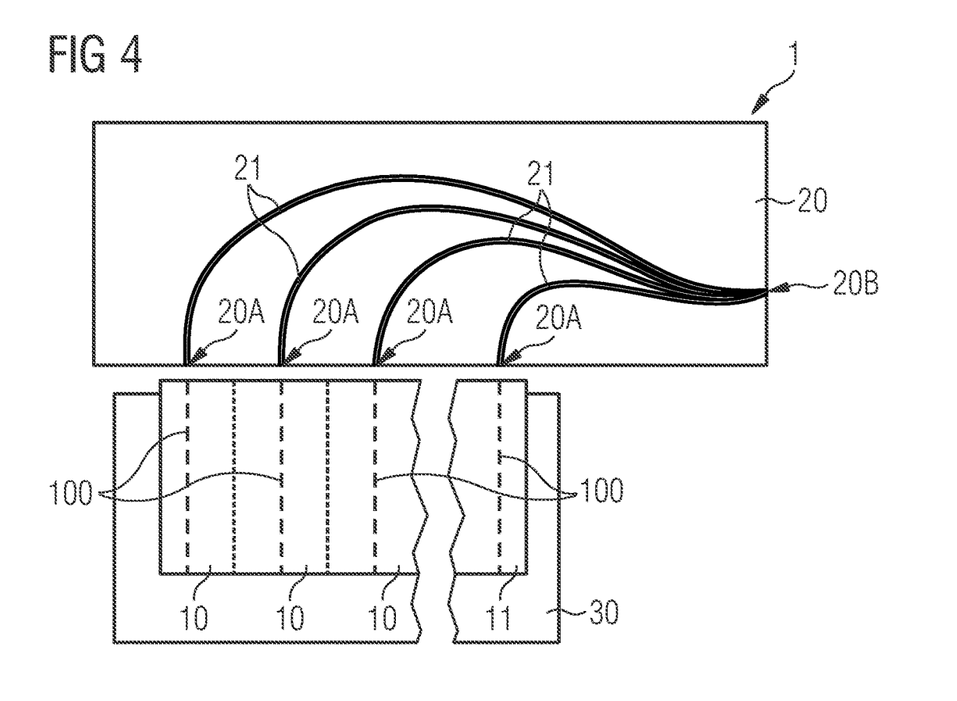
FIG. 4 shows a schematic top view of a semiconductor laser component described herein according to a fourth embodiment.

FIG. 4 shows a schematic top view of a semiconductor laser component 1 described herein according to a fourth embodiment. The fourth embodiment shows a monolithic semiconductor body 11 in which a plurality of semiconductor lasers 10 are formed. Each semiconductor laser 10 includes a resonator 100, and the resonators 100 are aligned parallel to each other. The monolithic semiconductor body 11 is disposed on a substrate 30. By means of a monolithic semiconductor body 11, a particularly compact design of the semiconductor laser component can be realized. For example, different semiconductor lasers 10 comprise a different doping to cause different main emission wavelengths, respectively.

Figure 5:
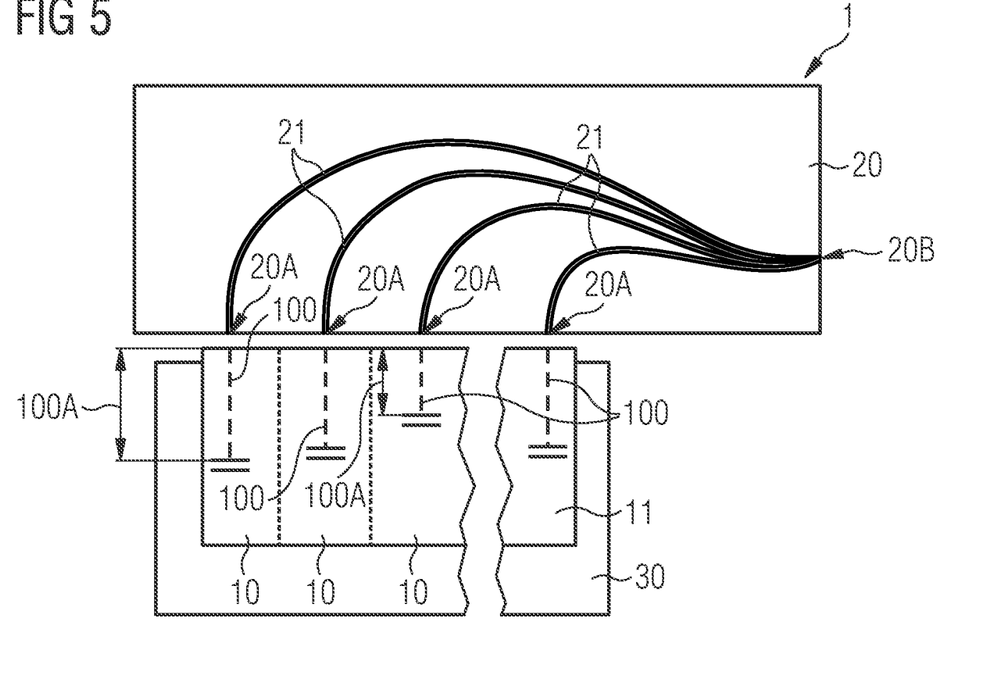
FIG. 5 shows a schematic top view of a semiconductor laser component described herein according to a fifth embodiment.

FIG. 5 shows a schematic top view of a semiconductor laser component 1 described herein according to a fifth embodiment. The fifth embodiment is substantially the same as the fourth embodiment shown in FIG. 4.

In contrast to the fourth embodiment, the resonators 100 formed in the monolithic semiconductor body 11 have different lengths 100A. The different lengths 100A of the resonators 100 are realized by means of mesa edges etched at different locations. Thus, a plurality of different resonator lengths 100A can be realized within the laser bar 11. By means of the different resonator lengths 100A, a different main emission wavelength of the different semiconductor lasers 10 can be generated particularly easily and, at the same time, a compact design is maintained due to the arrangement in a monolithic semiconductor body 11.

Figure 6:
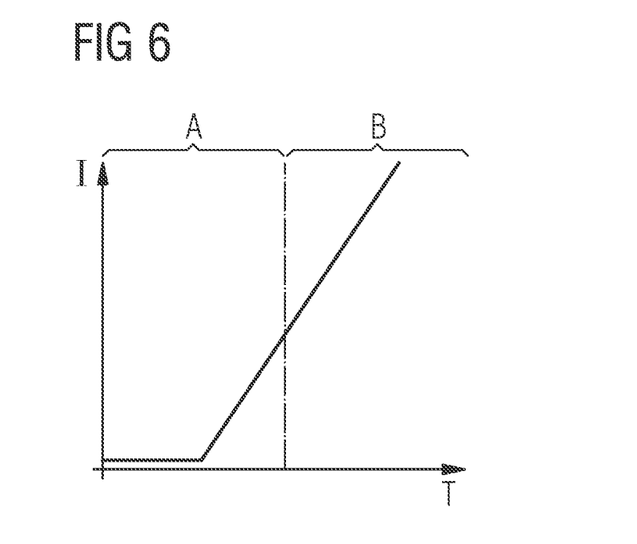
FIG. 6 shows a diagram of a characteristic curve of the intensity of the emitted electromagnetic radiation of a semiconductor laser over time according to a first embodiment of a method for operating semiconductor lasers described herein.

FIG. 6 shows a diagram of a characteristic curve of the intensity of the emitted electromagnetic radiation of a semiconductor laser 10 over time according to a first embodiment of a method for operating semiconductor lasers 10 described herein. The Y-axis represents the intensity of the emitted primary electromagnetic radiation of a semiconductor laser 10. The X-axis represents the time axis. The intensity starts to increase only after the laser threshold is exceeded and increases steadily up to a certain limit value. The limit value marks the transition from an increase region A and a subsequent stationary region B. After leaving the increase region A, the semiconductor laser 10 is in the stationary region B.

During emission of electromagnetic radiation in the increase region A, an increased primary spectral bandwidth with a decreased coherence length is observed. Operation of the semiconductor laser 10 in the stationary region B corresponds to a stable operating point and occurs with a substantially reduced primary spectral bandwidth and thus with an increased coherence length. Thus, operation of the laser within the increase region A advantageously has a low coherence length and a high primary spectral bandwidth. For example, the semiconductor laser 10 may be pulsed to achieve operation exclusively within the increase region A. The brightness of the semiconductor lasers 10 is given by the integral of the intensity over time. If the semiconductor lasers 10 are switched off again shortly after being switched on in order to achieve the widest possible spectral bandwidth, the value of the integrated brightness will be low. Consequently, for example, a pixel generated by the semiconductor laser 10 also appears relatively dark.

Figure 7:
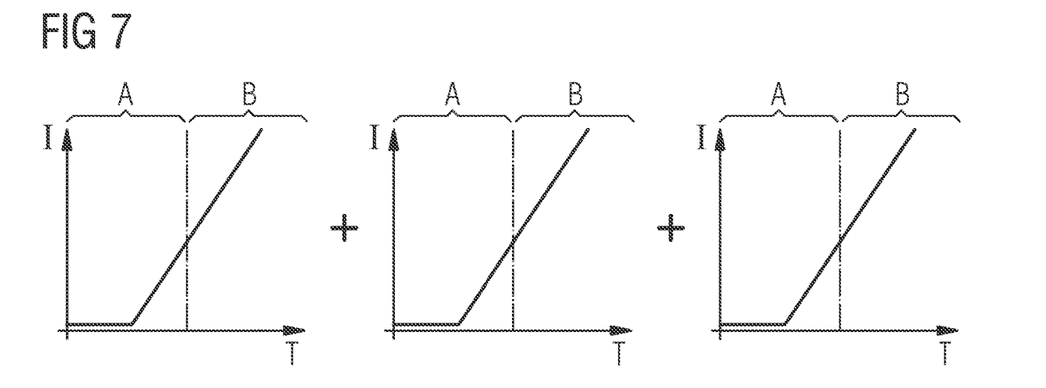
FIG. 7 shows diagrams of characteristic curves of the intensity of the emitted electromagnetic radiation of several semiconductor lasers over time according to a second embodiment of a method for operating semiconductor lasers described herein.

FIG. 7 shows diagrams of characteristic curves of the intensity of the emitted electromagnetic radiation of several semiconductor lasers 10 over time according to a second embodiment of a method described here for operating of semiconductor lasers 10. To achieve a quasi-continuous continuous operation of the semiconductor lasers 10, several semiconductor lasers 10 can be operated one after the other, each of them operating only within the increase region A. A first semiconductor laser 10 is operated up to the increase region A and then switched off, while directly following this is the operation of a further semiconductor laser 10 which is also operated only in the increase region A and then switched off. By continuing this series further, quasi-continuous operation of a plurality of semiconductor lasers 10 can be achieved.

Figure 8:
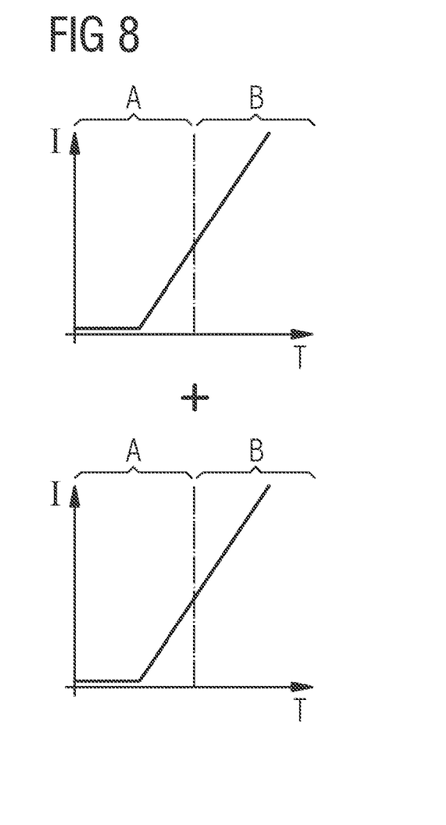
FIG. 8 shows diagrams of characteristic curves of the intensity of the emitted electromagnetic radiation of several semiconductor lasers over time according to a third embodiment of a method for operating semiconductor lasers described herein.

FIG. 8 shows diagrams of characteristic curves of the intensity of the emitted electromagnetic radiation of several semiconductor lasers 10 over time according to a third embodiment of a method for operating semiconductor lasers 10 described here. To increase the emitted intensity, simultaneous operation of a plurality of semiconductor lasers 10 is conceivable. For example, a plurality of semiconductor lasers 10 are operated only in their increase region A and thus in an operating mode with a high primary spectral bandwidth. The simultaneous superposition of the primary electromagnetic radiation increases the optical intensity of the generated primary electromagnetic radiation.

Alternatively, a combination of the operation modes according to the embodiment example shown in FIG. 7 and the embodiment example shown in FIG. 8 is also possible. For example, sequential operation of a plurality of semiconductor lasers 10 can be alternately performed to generate emission as continuously as possible, and simultaneous emission of a plurality of semiconductor lasers 10 can be alternately performed to generate emission as intensely as possible.

Figure 9:
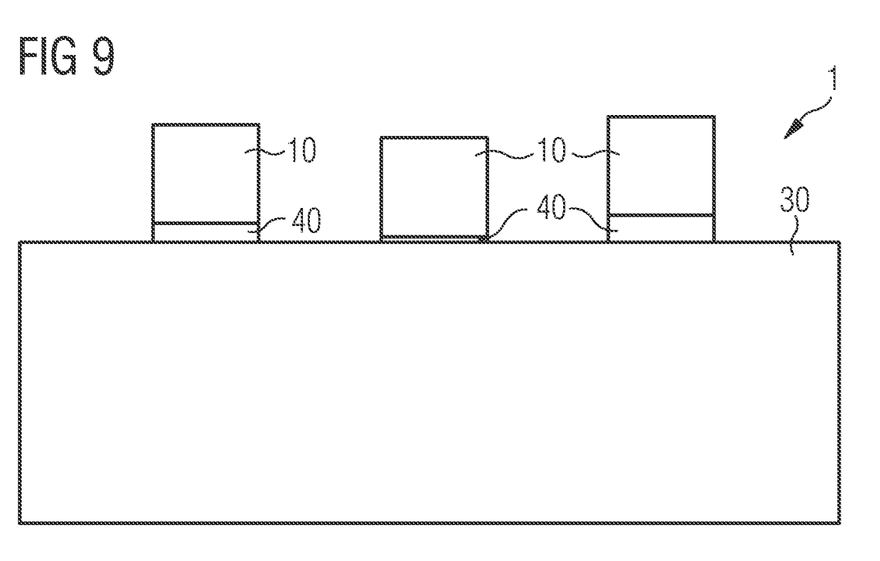
FIG. 9 shows a schematic sectional view of a semiconductor laser component described herein according to a sixth embodiment.

FIG. 9 shows a schematic sectional view of a semiconductor laser component 1 described herein according to a sixth embodiment. The semiconductor laser component 1 shown here comprises a common substrate 30 on which three semiconductor lasers 10 are arranged. An insulating layer 40 is disposed between each of the semiconductor lasers 10 and the substrate 30.

The insulating layer 40 has different thicknesses and thus can cause different thermal and/or electrical resistances between the semiconductor lasers 10 and the substrate 30. Additionally or alternatively, the insulating layer 40 may be locally patterned to further affect a thermal and/or electrical resistance. By means of the differently designed insulating layer 40, an operating temperature of each semiconductor laser 10 can thus be specifically influenced. By varying the operating temperatures as much as possible, a further reduction of the coherence length and thus an increase of the primary spectral bandwidth can be achieved.

The invention is not limited by the description based on the embodiments. Rather, the invention encompasses any new feature as well as any combination of features, which in particular includes any combination of features in the patent claims, even if this feature or combination itself is not explicitly stated in the patent claims or embodiments.

The invention claimed is:

1. A method for operating at least one semiconductor laser, the method comprising:
   operating each semiconductor laser in pulsed mode so that operation predominantly takes place in an increase region of the semiconductor laser,
   wherein each semiconductor laser has a characteristic curve of an optical output power over an operating time, which initially has the increase region and subsequently a stationary region.

2. The method according to claim 1,
   wherein at least two semiconductor lasers are operated simultaneously pulsed in the increase regions, or
   wherein at least two semiconductor lasers are operated successively pulsed in the increase regions.

3. A semiconductor laser component comprising:
   a plurality of semiconductor lasers, each of the semiconductor lasers configured to emit primary electromagnetic radiation of a primary spectral bandwidth in a visible wavelength range; and a beam combiner configured to:
  combine the primary electromagnetic radiations emitted from the semiconductor lasers,
  form secondary electromagnetic radiation from a superposition of the primary electromagnetic radiations of the semiconductor lasers, and
  couple the secondary electromagnetic radiation out from the beam combiner,
  wherein the secondary electromagnetic radiation has a secondary spectral bandwidth that is at least twice as large as an average value of the primary spectral bandwidths; and
an optical layer sequence arranged within a resonator of at least one semiconductor laser, a refractive index of the optical layer sequence being variable by applying an external electric voltage or electric current.

4. The semiconductor laser component according to claim 3, wherein the secondary spectral bandwidth is between 5 nm and 10 nm, inclusive.

5. The semiconductor laser component according to claim 3, wherein the beam combiner is a monolithic component.

6. The semiconductor laser component according to claim 3, wherein the semiconductor lasers have different resonator lengths.

7. The semiconductor laser component according to claim 3, wherein the semiconductor lasers are arranged on a common substrate.

8. The semiconductor laser component according to claim 7, further comprising a thermal insulating layer arranged between at least one semiconductor laser and the common substrate.

9. The semiconductor laser component according to claim 8, wherein the thermal insulating layer comprises silicon oxide or silicon nitride.

10. The semiconductor laser component according to claim 3, wherein at least some of the semiconductor lasers are arranged on a separate substrate.

11. The semiconductor laser component according to claim 3, wherein at least one semiconductor laser comprises a doping with a dopant that changes a main emission wavelength of the semiconductor laser.

12. The semiconductor laser component according to claim 3, wherein the semiconductor lasers are formed in a monolithic semiconductor body.

13. The semiconductor laser component according to claim 3, wherein the semiconductor lasers are arranged at different lateral distances from one another.

14. The semiconductor laser component according to claim 3, further comprising an actuator configured to generate a time-modulated mechanical stress in at least one semiconductor laser.

15. The semiconductor laser component according to claim 14, wherein the actuator comprises a piezo element.

16. The semiconductor laser component according to claim 3, further comprising an actuator associated with the semiconductor lasers, each actuator generating a time-modulated mechanical stress on the semiconductor lasers.

17. The semiconductor laser component according to claim 3, wherein a gradient mirror is arranged at an output coupling region of at least one semiconductor laser.

18. The semiconductor laser component according to claim 3, further comprising a dielectric mirror arranged at an output coupling region of at least one semiconductor laser.

19. The semiconductor laser component according to claim 3, wherein the semiconductor lasers are mounted on the beam combiner.

* * * * *